June 5, 1928.
W. A. LOTH
1,672,328
METHOD OF ELECTROMAGNETIC UNDERGROUND PROSPECTING
Filed Jan. 3, 1923
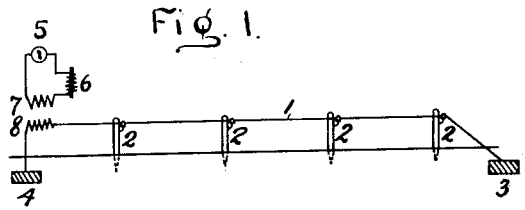
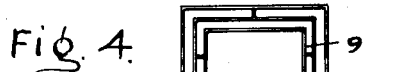
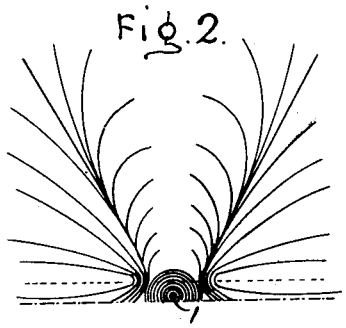
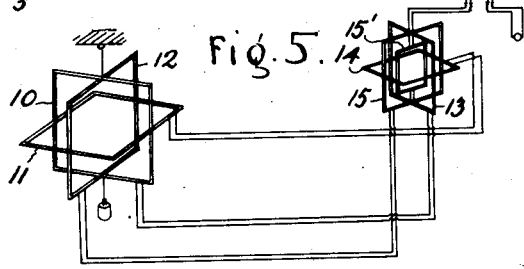
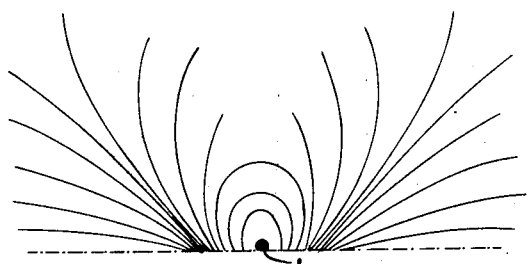
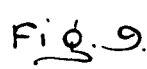
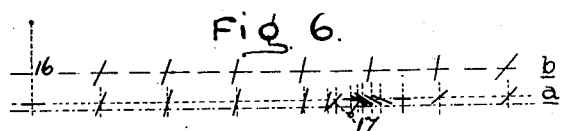
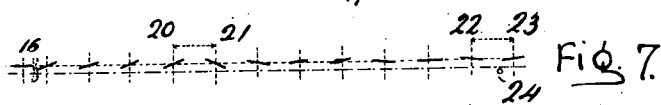
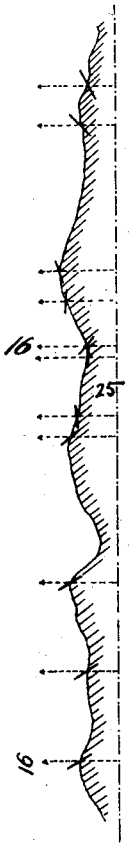
INVENTOR:
William A. Loth,
by Edward Williams
HIS ATTY.

Patented June 5, 1928.

1,672,328

UNITED STATES PATENT OFFICE.

WILLIAM A. LOTH, OF PARIS, FRANCE.

METHOD OF ELECTROMAGNETIC UNDERGROUND PROSPECTING.

Application filed January 3, 1923, Serial No. 610,438, and in France January 4, 1922.

It is common knowledge that electrical processes have been proposed for underground prospecting. Some of these processes are based on the sending of a continuous or variable electric current in an insulated line earthed at both ends, determining the lines of equal potential on the earth's surface by means of a receiving circuit having its terminals in contact with the earth and having a current detecting apparatus such as a galvanometer or telephone in the circuit.

The present invention is based on totally different principles, and consists essentially in receiving the necessary currents, not by the usual application of a line in direct or indirect connection with the ground, but by an induction process which avoids any material connection of the receiving system with the ground. The heterogeneous nature of the subsoil or subaqueous medium can then be detected and located by means of the singular points existing in the lines of force of the electromagnetic field thus explored.

For a better understanding of the invention, the following description will be given in connection with the attached drawing:

Figure 1 shows one form of installation for causing an electric current to flow through the portion of the earth to be prospected.

Figure 2 represents the magnetic field of force created by a submerged cable, for instance a submarine cable; and Figure 3 the field of a land cable.

Figure 4 shows an arrangement of receiving coils which can be utilized in connection with either one of the above magnetic fields; and Figure 5 an alternative arrangement, including a goniometric type of apparatus.

Figure 6 illustrates a typical alteration of the magnetic lines of force caused by an underground water conduit; and Figures 7, 8 and 9 show similar alterations due to various causes of heterogeneity of the ground; similar cases being detected in the same way in subaqueous media as under ground.

By my method of prospecting I establish a magnetic field by sending an electric current through an emitter formed by a line grounded at both ends and excited by a transformer whose primary is connected to an alternating current generator capable of delivering current at frequencies between 600 and 1500 cycles per second. This emitter is in reality a loop of a single turn, a portion of the circuit being completed by the earth to be explored, as will appear from the description following. The frequency of the exciting current is made variable to secure different degrees of penetration of the lines of force of the magnetic field into the surrounding subsoil.

Use can also be made of ultra-audible frequencies (then detected by means of the heterodyne system) or of infra-audible frequencies (with a tikker system of reception). Continuous current can also occasionally be used if a receiver system provided with a rotary movement is employed. In particular cases a metallic return wire located in the ground under the above line can also be used.

In practice the current employed is of an oscillating or alternating nature with a musical frequency and the line and the ground return are equivalent to an artificial coil or loop which is tuned or not. The return current reaches a great depth. The artificial loop thus obtained may be considered as having a certain phase difference with reference to the earth's surface and as being equivalent to a loop or coil the main axis of symmetry of which would be under the surface.

Figure 1 shows one arrangement of a current transmitting installation. The line 1 is supported on the posts 2 and is connected to the earth by plates 3 and 4. It receives the current generated by the alternator 5 through the regulating inductance 6 and the transformer 7—8.

Reception is effected according to the following principles.

The mass of the earth, which is rather conductive in average cases, may be considered as being composed of an infinite number of elementary conductors with return current lines corresponding individually to respective elementary magnetic fields centered on them. The resultant magnetic field results from the integration of all these elementary fields and it may be detected by means of proper apparatus used around or even inside of the conducting mass. It will be readily understood that the shape of the magnetic field is dependent upon the direction of flow of the earth currents and that changes in the latter caused by non-homogeneous deposits in the earth, such, for example, as oil or mineral deposits, will produce corresponding changes in the magnetic field and these changes may be readily determined by the method and apparatus described herein.

With the above elementary fields naturally coact and combine the fields which result (in case a variable alternating or oscillating current is fed into the artificial loop) from the currents induced in the conducting mass which are transversely set out of phase with reference to the return current this latter being deviated in phase in a direction parallel to the plane of the artificial loop with reference to the current sent into the line.

It results therefrom that, in the case of a homogeneous nature of earth of a given conductivity, and taking account of the earth capacity, the magnetic field of force will have a characteristic shape for a given frequency of the current sent in the artificial loop. In the case of a musical frequency, for instance 600 cycles, the field is found to be derived from a double lemniscate, considered in the particular case of the double tangent point as its origin.

In the case of a cable offering the same characteristics and laid on the bottom of the sea the horizontal axis is displaced towards the sea level (Figure 2).

Figure 3 represents the resultant field at 600 cycles, the lines corresponding to the lines of force taking a variable angle of inclination on issuing from the ground with the increase of their distance from the artificial loop.

Experience has confirmed the above premises. It results therefrom that, in a horizontal plane, for instance, the shape of the field above outlined may be easily found and experience again confirms this.

But if the earth's surface is supposed to be horizontal and its mass not homogenous, with certain of its parts offering differences in electric conductivity and magnetic permeability, the resultant magnetic field, which has a characteristic form, is altered and from the aspect of its alterations it is possible to find out the origin, the nature and thus the location of the elements which cause these alterations. It is possible to analyze the field and to detect these alterations by studying the field in a horizontal plane.

In the case of the earth's surface not being horizontal this will be taken into account and the measurements made will be corrected and compared to those which would correspond to a horizontal plane. This study can be made, not only on the earth's surface, but in the air by raising the receiver used for analyzing the field, or underground by placing the same in holes or recesses dug in the ground, or in mining shafts or by burying it in the ground. The apparatus may similarly be submerged in sea or river and even set on the bottom of the sea or river for analysis of the submarine ground, a repeating apparatus being used aboard ship for showing the degree of horizontality of the bottom apparatus and its orientation with reference to the N. S. line.

Thus with the process according to the invention the determination made does not depend on the return currents themselves as was the case with the prospecting methods used hitherto, which currents are altered by the telluric currents, nor does it apply to a natural magnetic field having a constant or slowly varying value resulting from magnetized bodies or a natural constant magnetic field altered by magnetic bodies. On the contrary, the determination is effected at each and every point by the lines of force of a magnetic field of a specific shape rationally obtained, which field varies with any proper frequency for the analysis to be made. Consequently in place of receiving by conduction as in the electrical methods of underground prospecting and by means of a base whose extremities are connected to earth directly or indirectly, according to the present invention the reception is effected by induction without contact with the earth. It is clear however that these various means may be conveniently combined.

The receiving apparatus is composed either of a light and movable frame mounted on gimbals (Figure 4, whose sides are for example of one metre of fifty centimeters) around which is wound a coil of several turns (for example fifty turns of an insulated wire of one tenth millimetre) or of a system of three fixed frames at right angles to each other and disposed in the three usual planes of space coordinates (Figure 5). The movable frame of Fig. 4 or the system of three fixed frames of Fig. 5 is connected directly or by means of an amplifier (shown at 15" in Figure 5) which may be tuned, with a current detector such as a galvanometer or telephone which may be tuned and associated or not associated with a resonator or a loud speaker.

As regards the system of three frames at right angles to each other, the operator 1. May listen successively on each one separately, or
2. He may also connect them in series two by two, or
3. He may connect each of them to the corresponding coil of a small system of three coils at right angles to each other and constituting a direction finder (Figure 5). This system of three coils is disposed on the earth's surface together with an indicator of the inclination of the earth's surface, or it is suspended as a pendulum so as to maintain one of the coils in a horizontal plane. The system may also be put under water or under ground or in a cavity. This enables the operator to obtain an indication of the refraction of the field lines. By listening successively on each coil, a rough estimate of the inclination of the field lines is obtained. By connecting the coils in series two by two successively and in opposite directions a closer approximation is obtained and it is easy to determine the quarter circle through which the field lines pass.

By connecting the three coils of the system to the corresponding smaller coils of the direction finder, 10 with 13, 11 with 14, and 12 with 15, either simultaneously or successively two by two, not only the quarter circle in which the field lines pass is obtained, but also the inclination of these lines to an approximation of one degree, by putting the small movable frame 15' of the direction finder, which is mounted on gimbals, in a position of maximum or minimum of received energy. It is obvious that the current in any one coil of one set, such as coil 11, is the same as the current in its corresponding coil, 14, of the other set of coils. Now when the coils 10, 11 and 12 are placed in a varying magnetic field it is obvious that the coils 13, 14 and 15, if placed at a distance will produce a magnetic field of its own which will be a replica of the magnetic field which induces currents in the coils 10, 11 and 12. With this arrangement the coils 10, 11 and 12 may be moved around over the area being prospected while the coils 13, 14 and 15 remain stationary at some convenient point where the nature of the magnetic field at the various points at which the coils 10, 11 and 12 are placed may be determined by means of the coil 15', which is universally mounted, and suitable detecting apparatus 15''. The method of determining the nature of the magnetic field by means of coil 15' is the same as when the coil 8 shown in Fig. 4 is used. The use of this apparatus makes possible the use of more delicate instruments since only the coils 10, 11 and 12 are moved from point to point and these coils may be rather rugged in construction. Two small direction finders may also be used, one composed of vertical coils at right angles to each other and the other of a vertical and a horizontal coil.

In operation the generating and the receiving set may both be placed on the same carriage. The generating set should be, for example, an interrupted current generator or a small alternator driven by hand or mechanically. The insulated cable 1, which is wound on a small drum, is unwound and extended in a straight line and both ends of the cable are earthed by being connected to the plates 3 and 4 located in the earth, as illustrated in Fig. 1. This cable is preferably inductively connected to the circuit of the alternator or other source of electrical energy by means of the transformer 7—8. The receiver is then placed in position by means of the carriage or by hand and the soil is explored by sections around the artificial loop of the generating set. The inclination of the field lines at a given place is obtained when the plane of the movable coil is at right angles to the field lines, the received energy in the coil then being at a maximum. The measure of the inclination with the direction finder is then obtained by determining when the intensity of the received current in the telephone or the galvanometer connected in the coil circuit is at a maximum. A thermic or electro-dynamic receiver may also be used. The variable current may likewise be rectified. As before stated it will be noted that on a horizontal plane the farther the distance to the artificial coil the more inclined in that plane the field lines must be (Figure 3).

If at a given point the inclination of the field lines is abnormal, this is due to the fact that the subsoil modifies the form of the magnetic field and a study of the special form of the field may indicate the character of the subsoil. The usual form of the magnetic field will be modified when the subsoil is not homogeneous as to its electric or magnetic properties. While such changes in the form of the magnetic field will generally be due to the change in the direction of the earth currents caused by deposits, as described above, they may be caused by other influences. Thus the form of the magnetic field will be changed to some degree by the direct action of certain deposits on the magnetic flux. As a result it will be possible to locate pools of water, soil beds of a wholly or partially metallic nature, water pipes, petroleum deposits which often lie in the neighborhood of salt water pools, etc.

In making an exploration of the subsoil the following procedure is adopted. The emitter is set up as shown in Figure 1 and the line excited by the generator at a given low frequency, say at 100 cycles per second. The current that flows in the loop formed by the emitter will set up a magnetic field similar to those already described and illustrated if it is not disturbed by the presence of subsoil deposits. A receiving frame similar to that shown in Figures 4 or 5 is then used to determine the surrounding magnetic field. This may be done in any systematic manner as by starting at 4 in Figure 1 and making observations at every meter's distance along a line at right angles to the loop, first making observations to the right and then to the left of the base line 4—3 established by the loop. Further observations are then made to the right and left of points spaced along the base line 4—3 in a similar manner so that the exploration extends over the territory surrounding the emitter. If a receiver such as shown in Figure 4 is used at each point of observation, the receiving coil will be moved about a vertical axis until it is in a position of maximum reception and then inclined about a horizontal axis until it again gives maximum reception to determine the degree of inclination of the lines of force of the magnetic field established by the emitter at each point. The inclination will be measured by a goniometer associated with the frame. As a result of many observations the magnetic field in any given plane may be reconstructed and compared with that field which would be expected were it uninfluenced by any disturbing factors. Thus by comparing the observed inclinations of the lines of force with the inclinations of the lines that would be expected were the subsoil perfectly homogeneous, it is possible to immediately determine the presence and location of disturbing substances which will be indicated by a departure in the observed field from that field expected were the soil perfectly homogeneous.

In Figure 6 is shown in vertical cross section a the influence on the form of the magnetic field shown at b of a metallic water pipe. The base of emission is represented at 16 and the pipe at 17, this latter being at 46 metres 80 centimetres from the artificial coil and one metre 40 centimetres below ground level. Its position is determined electromagnetically by lines perpendicular to the direction of the exploring coil on both sides of the pipe.

In Figures 7 and 8 is shown how the form of the field is changed by the presence of two water pipes 18 and 19 (Figure 8) and of telephone and telegraph lines passing through points 20 and 21. They are at 1,050 metres and 1,100 metres respectively from the artificial coil of emission. Figure 8 shows on a larger scale a cross-section of the subsoil in the neighbourhood of points 20 and 21 (Figure 7). It should be noticed also that between points 22 and 23 which are respectively at 1,400 and 1,450 metres from the artificial coil of emission, the inclination of the field lines is abnormal due to the presence of water pipe 24.

Figure 9 shows the influence on the form of a magnetic field of a pool of water 25 located below the surface of the soil and situated 4 kilometres away from the artificial coil. This figure shows the inclination on a vertical plane of the field lines, the distances being measured at the surface of the soil taking into account the inclination of that surface to a horizontal plane.

The exploration may be made at a great distance from the coil of emission. It is seen that as soon as the inclination of the field lines become unusual it indicates something of interest in the surroundings and when by its nature the disturbing element is particularly efficacious, the field lines are in a horizontal plane.

What I claim as new and desire to secure by Letters Patent of the United States is:—

1. The method of underground prospecting which consists in passing an electric current through the earth and determining at a plurality of correlated points, the inclination of the lines of magnetic flux produced by the current.

2. The method of underground prospecting which consists in creating a field of magnetic flux by passing an electric current through the portion of the earth to be prospected, and determining the inclination of the lines of magnetic flux over the entire area to be prospected.

3. The method of underground prospecting which consists in determining the character of the subsoil from an analysis of a reconstruction of a portion of the field of magnetic flux created by passing an electric current through the portion of the earth to be prospected.

4. The method of underground prospecting which consists in passing an electric current through the earth, determining at a plurality of correlated points the inclination of the lines of magnetic flux produced by the current, and plotting upon a chart the values of inclination determined at the correlated points.

5. The method of underground prospecting which consists in passing an electric current through the earth, and in determining the character of the subsoil from an inspection of a representation of the values of the inclination with respect to a fixed plane of the lines of magnetic flux produced by the current, at a plurality of correlated points in the region to be prospected.

6. The method of underground prospecting which consists in passing an electric current through the earth and determining the character of the subsoil of the field to be prospected, from a survey over a given area of the inclination with respect to a fixed plane of the lines of magnetic flux produced by the current.

7. The method of underground prospecting which consists in passing an electric current through the earth and determining the character of the subsoil of the field to be prospected, from a survey over a given area, of the direction in space of the lines of magnetic flux produced by the current.

8. In apparatus for underground prospecting, means for passing a variable electric current through a loop comprising an insulated conductor and a ground return, means adapted to be subjected to the influence of the field of magnetic flux created by the current and means connected with the second named means for reproducing a portion of the magetic field at a distance.

9. In apparatus for underground prospecting, means for creating a field of magnetic flux in an area to be prospected comprising a source of electric current, an insulated conductor and a ground return, means adapted to be placed in the magnetic field, and means connected with the first named means capable of producing a magnetic field having a direction in space similar to that of the first named magnetic field.

10. In apparatus for underground prospecting, means for passing an electric current through the portion of the earth to be prospected, means adapted to be influenced by the magnetic field produced by the current at a point to be explored, means connected with the second named means capable of producing a magnetic field having a direction in space similar to that of the first named magnetic field, and means for determining the direction in space of the second named magnetic field.

11. In apparatus for underground prospecting, means for creating a magnetic field in the area to be prospected comprising an insulated electric current carrying conductor and a ground return, means comprising three fixed coils mounted at right angles to each other and adapted to be subjected to the influence of the magnetic field, and means connected with the second named means capable of producing a magnetic field having a direction in space similar to that of the first named magnetic field, the second named means comprising three fixed coils mounted at right angles to each other, and means for determining the inclination with respect to a fixed plane, of the second named magnetic field.

12. In a system of underground prospecting means for passing an electric current through a loop comprising an insulated conductor and a ground return, means for determining the inclination of the lines of magnetic flux produced by said current, comprising three fixed coils mounted at right angles to each other at a point to be explored, a similar system of three fixed coils at a distant point of observation and capable of producing lines of magnetic flux having a direction in space similar to that of the first named lines of magnetic flux, means for connecting corresponding coils of the two sets and means for determining the inclination with respect to a fixed plane of the lines of magnetic flux produced by the second named system of three fixed coils.

In witness whereof, I have hereunto set my hand this 18th day of December, 1922.

WILLIAM A. LOTH.